(12) United States Patent
Han

(10) Patent No.: US 6,331,880 B1
(45) Date of Patent: *Dec. 18, 2001

(54) LIQUID CRYSTAL DISPLAY AND METHOD FOR FORMING THE SAME

(75) Inventor: Chang Wook Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/257,300

(22) Filed: Feb. 25, 1999

Related U.S. Application Data

(62) Division of application No. 08/738,708, filed on Oct. 28, 1996.

(30) Foreign Application Priority Data

Jan. 15, 1996 (KR) .................................................. 96-00671

(51) Int. Cl.⁷ .............................. G02F 1/136; H01L 29/04
(52) U.S. Cl. ................................................. 349/43; 257/72
(58) Field of Search ................................ 349/42, 43, 46, 349/138, 139; 257/57, 72, 54

(56) References Cited

U.S. PATENT DOCUMENTS

| | | | |
|---|---|---|---|
| 4,857,907 | 8/1989 | Koden | 340/784 |
| 4,938,567 | * 7/1990 | Chartier | 350/333 |
| 5,015,597 | 5/1991 | Vinouze et al. | 437/41 |
| 5,166,085 | * 11/1992 | Wakai et al. | 438/158 |
| 5,414,283 | 5/1995 | den Boer et al. | 257/59 |
| 5,478,766 | * 12/1995 | Park et al. | 438/158 |
| 5,498,573 | 3/1996 | Whetten | 437/192 |
| 5,508,765 | * 4/1996 | Nakagawa et al. | 349/42 |
| 5,580,796 | * 12/1996 | Takizawa et al. | 438/158 |
| 5,615,028 | 3/1997 | Ishiguro et al. | 349/42 |
| 5,757,453 | * 5/1998 | Shin et al. | 349/138 |
| 5,771,083 | 6/1998 | Fujihara et al. | 349/147 |
| 5,784,133 | * 7/1998 | Kim et al. | 349/44 |
| 5,818,551 | * 10/1998 | Park | 349/43 |
| 5,859,683 | * 1/1999 | Tagusa et al. | 349/138 |
| 5,883,682 | * 3/1999 | Kim et al. | 349/43 |
| 5,894,136 | * 4/1999 | Wook | 349/42 |
| 5,926,235 | * 7/1999 | Han et al. | 349/43 |
| 5,981,973 | * 11/1999 | Matsuzaki et al. | 257/72 |

* cited by examiner

Primary Examiner—William L. Sikes
Assistant Examiner—Dung Nguyen
(74) Attorney, Agent, or Firm—Morgan, Lewis & Bockius LLP

(57) ABSTRACT

A liquid crystal display includes a substrate, a gate electrode on the substrate, a gate insulating layer on the substrate and the gate electrode, a first semiconductor layer on the gate insulating layer, a second semiconductor layer on the first semiconductor layer, and a conductive layer on the second semiconductor layer. The conductive layer includes a data line and source and drain electrodes. The first semiconductor layer is wider than the conductive layer.

16 Claims, 10 Drawing Sheets

LIQUID CRYSTAL DISPLAY AND METHOD FOR FORMING THE SAME

This is a divisional of copending application(s) application Ser. No. 08/738,708 filed on Oct. 28, 1996.

BACKGROUND OF THE INVENTION

1. Field of the Invention

The present invention relates to a liquid crystal display (LCD), and more particularly, to an LCD and its fabrication method with enhanced reliability.

2. Discussion of the Related Art

Generally, an LCD has a lower substrate having a thin film transistor (TFT) and a pixel electrode, an upper substrate having a color filter for displaying color and a common electrode, and a liquid crystal filled between the lower and upper substrates. Here, glass or crystalline is generally used as the material for the substrates.

A crystal substrate facilitates the use of a high temperature process, but is rarely used to fabricate a large-sized display. Also, a crystal substrate is too expensive.

A glass substrate, however, is relatively inexpensive, but cannot be used in a high temperature process, and has a reduced reliability from stress. That is, the stress on the glass substrate is different when depositing a chrome layer on the glass substrate as opposed to depositing an amorphous silicon layer on the glass substrate.

FIGS. 1A and 1B illustrate a stress characteristics when chrome is generally deposited on a glass substrate. FIGS. 2A and 2B illustrate stress characteristics when amorphous silicon is generally deposited on the glass substrate.

Referring to FIG. 1A, when a chrome layer 2 is deposited on the glass substrate 1, the substrate takes on a tensile stress. Thus, the glass substrate 1 is bent upward, as shown in FIG. 1B.

Referring to FIG. 2A, when an amorphous silicon layer 3 is deposited on the glass substrate 1, the glass substrate 1 is bent downward, as shown in FIG. 2B.

Accordingly, when a data line is formed of chrome in the LCD, the glass substrate is bent by the tensile stress as shown in FIG. 1B, but tends to return to its original state. Hence, a weak portion in the data line may become open.

The conventional LCD is described below with reference to the attached drawings.

Generally, an upper substrate of the LCD includes an active display area where a TFT and pixel electrode are arranged, a gate line pad for applying a driving signal to a TFT gate electrode of the active display area, and a data line pad for applying a data signal to a TFT source electrode. The TFT and pixel electrode of the active display area is illustrated in FIG. 3. In particular, the TFT is formed at the intersection of the gate line and data line, where the gate line is connected to a gate electrode, the data line is connected to a source electrode, and the drain electrode is formed to be connected to an ITO pixel electrode.

Here, for the active area of the TFT, the amorphous silicon layer is deposited between the gate electrode and source/drain electrode, and the active area is formed under the data line and is wider than the data line.

A method for forming the conventional LCD is described below with reference to FIGS. 4A–4E, which are cross-sectional views taken along the line I–I' in FIG. 3.

As illustrated in FIG. 4A, a metal such as aluminum (Al) is deposited on a glass substrate 1, and then selectively etched to form a gate line including a gate electrode 4. As illustrated in FIG. 4B, a gate insulating layer 6 (such as a silicon nitride layer), an amorphous silicon layer 7, and a high concentration n-type amorphous silicon layer 8 are sequentially deposited on the overall surface of the glass substrate 1 including the gate line. As illustrated in FIG. 4C, the amorphous silicon layer 7 and high concentration n-type amorphous silicon layer 8 are selectively removed except on the active area and the data line region of TFT.

As illustrated in FIG. 4D, a chrome layer 9 is deposited on the overall surface of the substrate, and then selectively removed except on the high concentration n-type amorphous silicon layer 8 of the data line region and on both sides of the amorphous silicon layer 7 and high concentration n-type amorphous silicon layer 8 of the active area to form the data line and source/drain electrode of the TFT. The exposed center portion of the high concentration n-type amorphous silicon layer 8 is removed using the chrome layer of the source/drain electrode as a mask. Here, the data line and source electrode are integrally formed (not shown).

As illustrated in FIG. 4E, a passivation layer 10 is formed on the overall surface of the substrate having the chrome layer 9. Then, the passivation layer on the chrome layer 9 of the drain electrode is selectively removed to form a contact hole. A transparent conductive layer is deposited on the overall surface and then selectively etched to remain only on the pixel area to form a transparent electrode 11. The transparent electrode 11 of the pixel area is electrically connected to the chrome layer 9 of the drain electrode through the contact hole.

However, the conventional LCD has problems as follows.

As the chrome layer is deposited in a state where the amorphous silicon layer and high concentration n-type amorphous silicon layer are formed on the active area and data line area, (with the remaining portion removed) the glass substrate takes on a tensile stress and becomes bent. Moreover, because the glass substrate also has a tendency to return to its original (unbent) state, the data line becomes open. Therefore, the reliability of the LCD is decreased.

SUMMARY OF THE INVENTION

Accordingly, the present invention is directed to a liquid crystal display and method for forming the same that substantially obviates one or more of the problems due to limitations and disadvantages of the related art.

A feature of the invention is to provide an LCD and fabrication method for preventing the data line from becoming open.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display includes a substrate; a gate line formed on the substrate, and having a gate electrode; a gate insulating layer formed on the overall surface of the substrate including the gate line; a data line formed on the gate insulating layer and having source/drain electrode; an intrinsic semiconductor layer and high concentration n-type semiconductor layer formed between the data line and gate insulating layer and wider than the width of the data line; a passivation layer formed on the overall surface of the substrate including the semiconductor layer, and having a contact hole on the drain electrode; and a pixel electrode formed on a pixel area and connected to the drain electrode.

In another aspect, the present invention provides a method for forming a liquid crystal display including the steps of forming a gate line having a gate electrode on a substrate; sequentially depositing a gate insulating layer, semiconductor layer and high concentration n-type semiconductor layer on the overall surface of the substrate including the gate line; forming a data line and source/drain electrode on the respective portions of the high concentration n-type semiconductor layer; selectively removing the high concentration n-type semiconductor layer and semiconductor layer to remain only under the data line and on the active area of a thin film transistor; and forming a passivation layer on the overall surface of the substrate where the data line and source/drain electrode are formed, forming a contact hole on the pad and the drain electrode, and then forming a transparent electrode on the pad and pixel.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENT

Reference will now be made in detail to the preferred embodiments of the present invention, examples of the which are illustrated in the accompanying drawings.

Figure 1A:
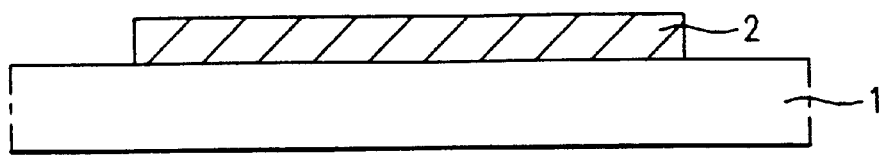
FIGS. 1A and 1B illustrate stress characteristic when chrome is generally deposited on a glass substrate.
Figure 1B:
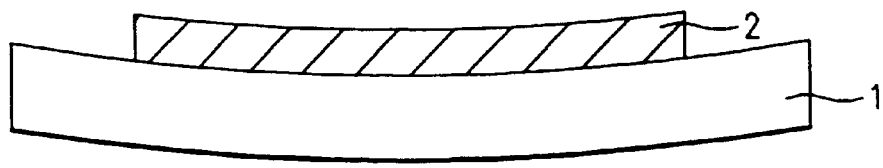
Figure 2A:
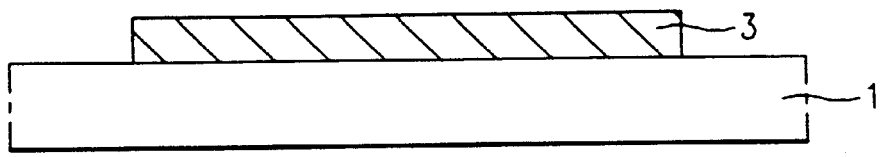
FIGS. 2A and 2B illustrate stress characteristic when amorphous silicon is generally deposited on a glass substrate.
Figure 2B:
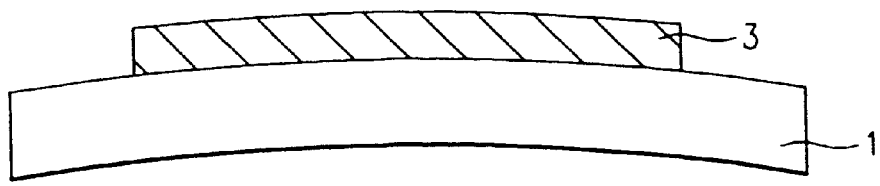
Figure 3:
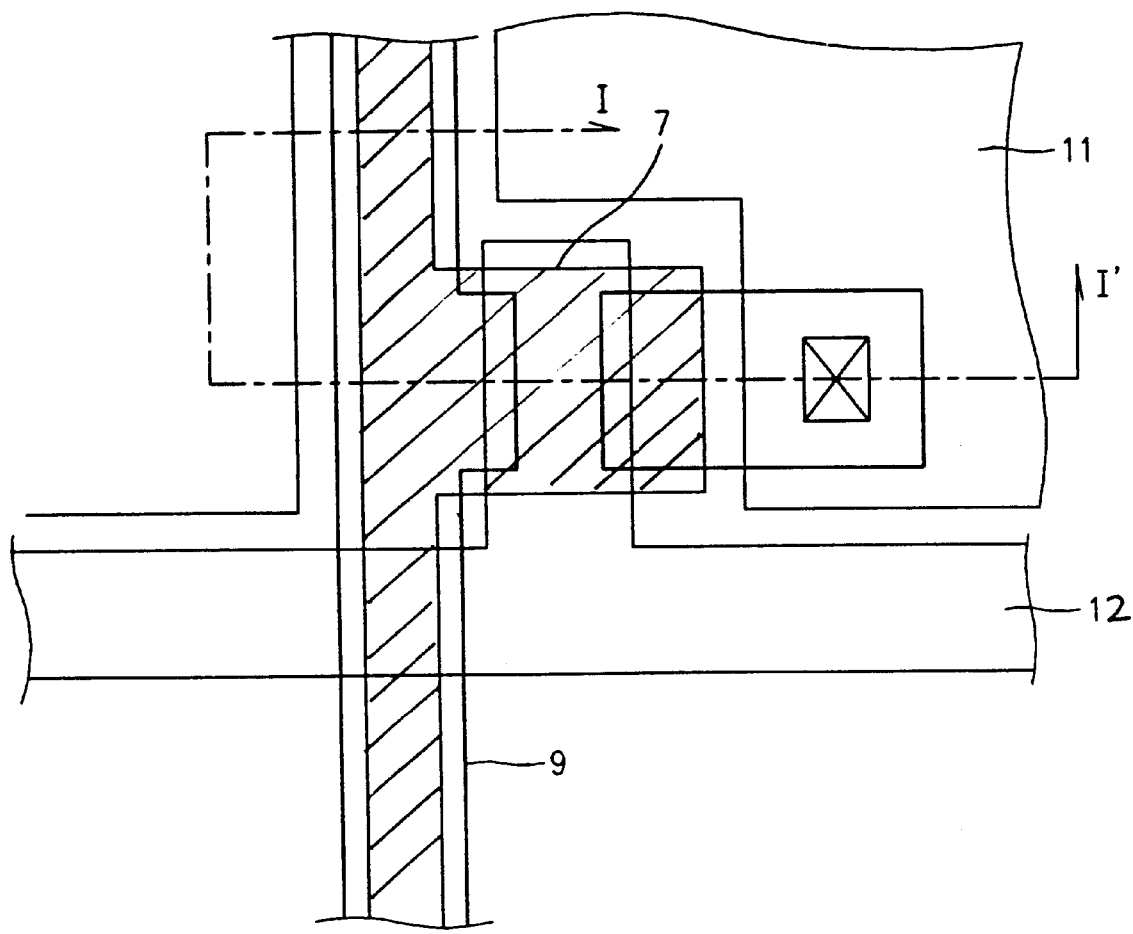
FIG. 3 shows a layout of a conventional LCD.
Figure 4A:
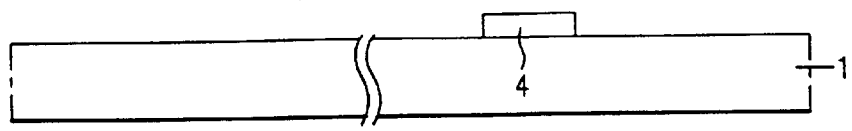
FIGS. 4A to 4E are cross-sectional views of FIG. 3 taken along line I–I'.
Figure 4B:
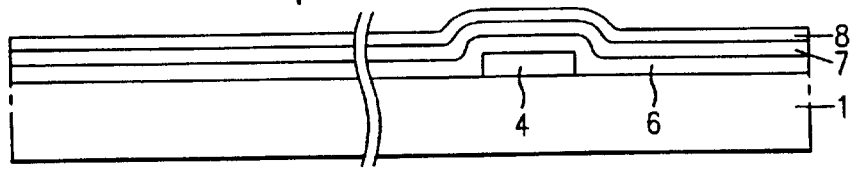
Figure 4C:
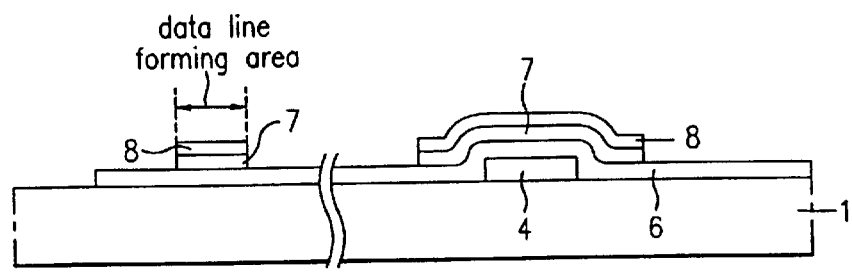
Figure 4D:
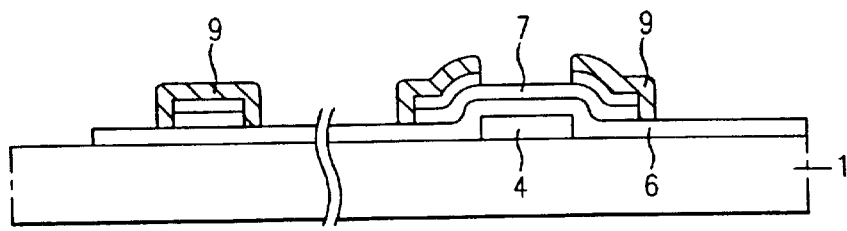
Figure 4E:
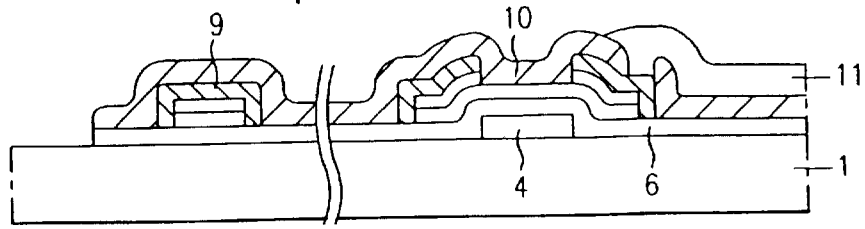
Figure 5:
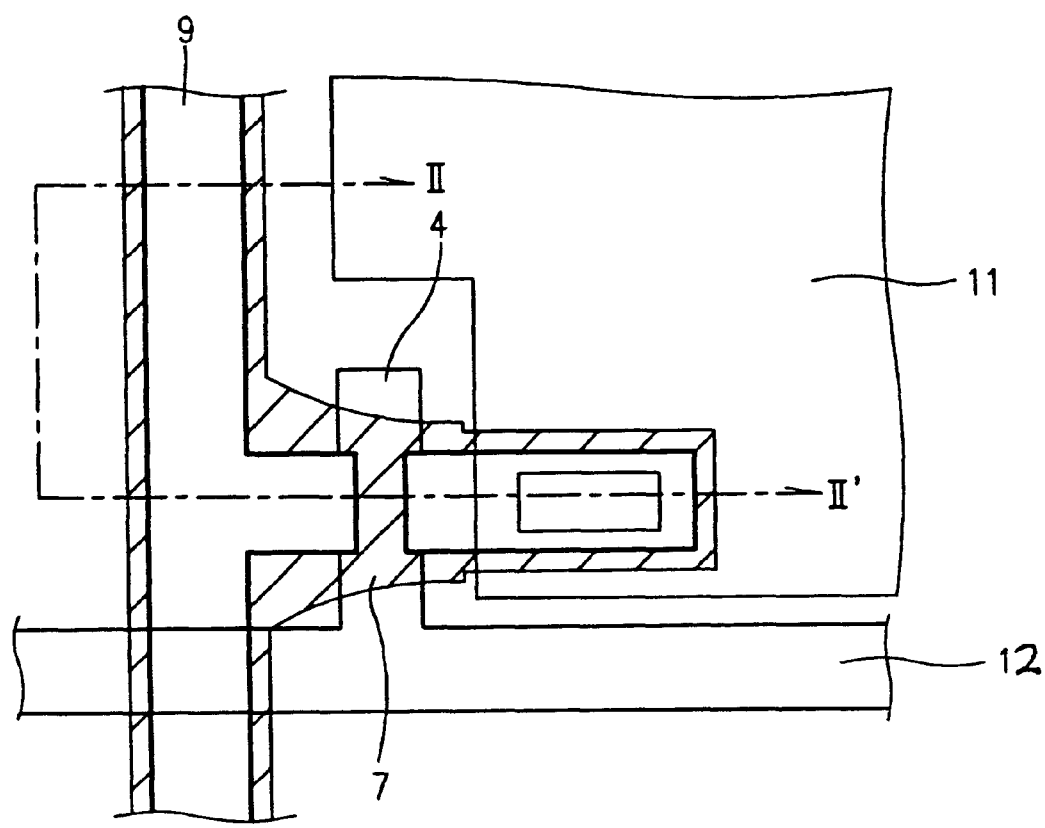
FIG. 5 shows an LCD layout of an embodiment of the present invention.

FIG. 5 shows a layout of an LCD in accordance with the present invention. As shown in FIG. 5, a TFT is located at an intersection of a gate line 12 and a data line 9.

The gate line 12 having a gate electrode 4 is formed on a glass substrate. A gate insulating layer is formed on the overall surface of the glass substrate including the gate line. An amorphous silicon layer and high concentration n-type amorphous silicon layer are formed on a portion where a data line and TFT are to be formed. The data line and source/drain electrode are formed on the high-concentration n-type amorphous silicon layer. The data line 9 is formed to be narrower than the amorphous silicon and the high concentration n-type amorphous silicon layer. The high concentration n-type amorphous silicon layer 8 is formed on the TFT region to have the same width as the source/drain electrode. The amorphous silicon layer is formed to be wider than the source/drain electrode. A passivation layer is formed on the overall surface of the substrate to have a contact hole at the drain electrode. A transparent electrode 11 is formed over the passivation layer and connected to the drain electrode through the contact hole.

A method of forming the LCD of the present invention is described below with reference to FIGS. 6A to 6E, which are cross-sectional views taken along line II–II' in FIG. 5.

Figure 6A:
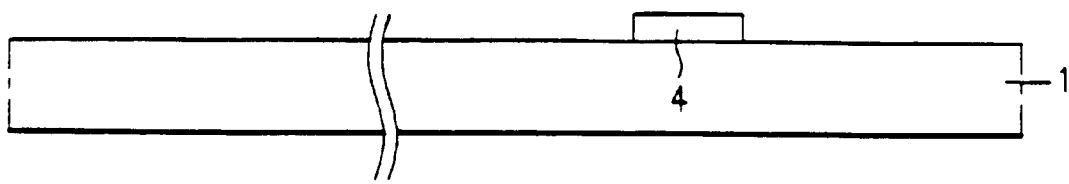
FIGS. 6A to 6F are cross-sectional views taken along line II–II' of FIG. 5 showing the fabrication process of the LCD of the present invention.
Figure 6B:
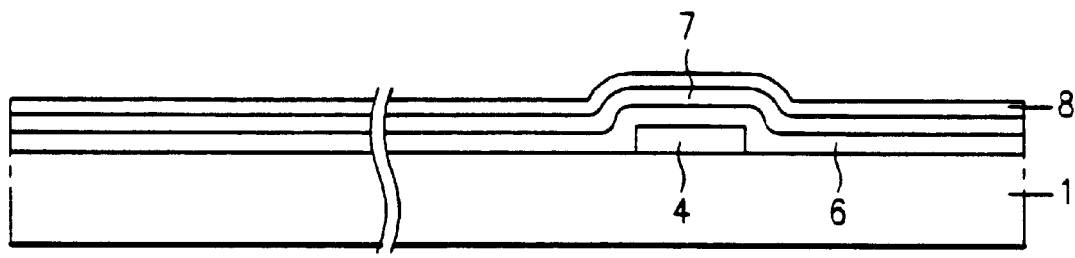

As illustrated in FIG. 6A, a metal such as aluminum Al is deposited on a glass substrate 1, and then selectively etched to form a gate line having a gate electrode 4. A gate insulating layer 6 such as a silicon nitride layer, amorphous silicon layer 7, and high concentration n-type amorphous silicon layer 8 are successively deposited on the overall surface of the glass substrate 1 including the gate line, as shown in FIG. 6B.

Figure 6C:
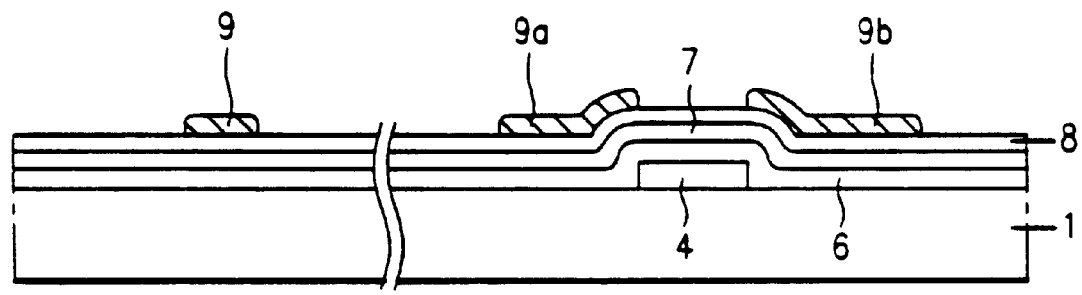

As illustrated in FIG. 6C, a chrome (Cr) layer is deposited on the overall surface of the substrate and then selectively removed to remain only in the data line region and source/drain region. Thus, a data line 9 and source and drain electrodes 9a and 9b of the thin film transistor are formed.

Figure 6D:
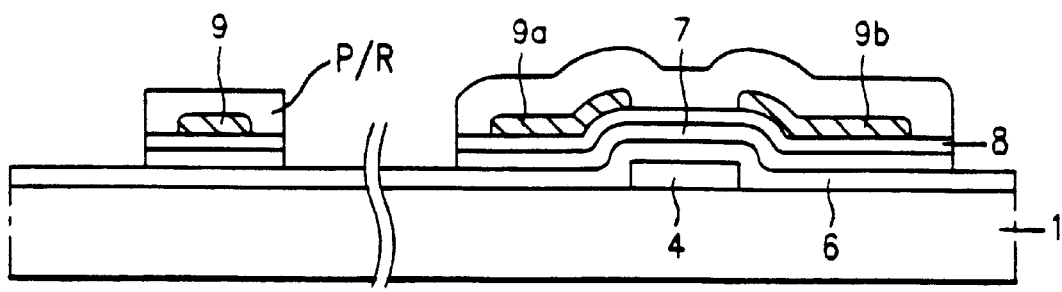
Figure 6E:
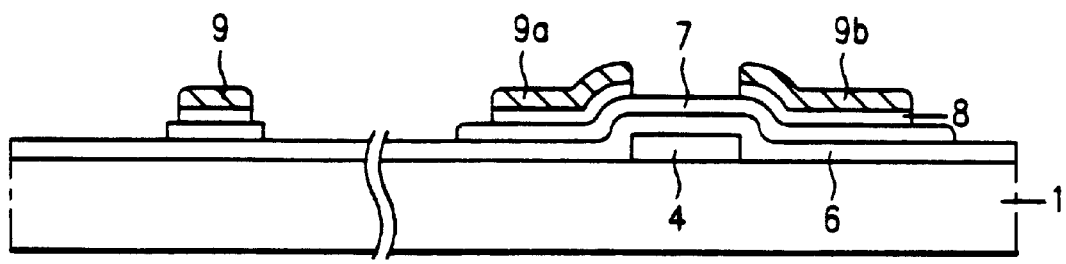

As illustrated in FIG. 6D, the high concentration n-type amorphous silicon layer 8 and amorphous silicon layer 7 are selectively removed to remain only in the data line area and active area of the thin film transistor, using a photoresist as a mask. The photoresist is removed and the high concentration n-type amorphous silicon layer 8 of the active area corresponding to a channel region of the TFT is also removed using the source and drain electrodes 9a and 9b as masks, as shown in FIG. 6E.

Here, the data line and source electrode are integrally formed (not shown). While the high concentration n-type amorphous silicon layer 8 under the source/drain electrode is formed as wide as the source/drain electrode, the high concentration n-type amorphous silicon layer 8 and amorphous silicon layer 7 under the data line are formed wider than the data line.

Figure 6F:
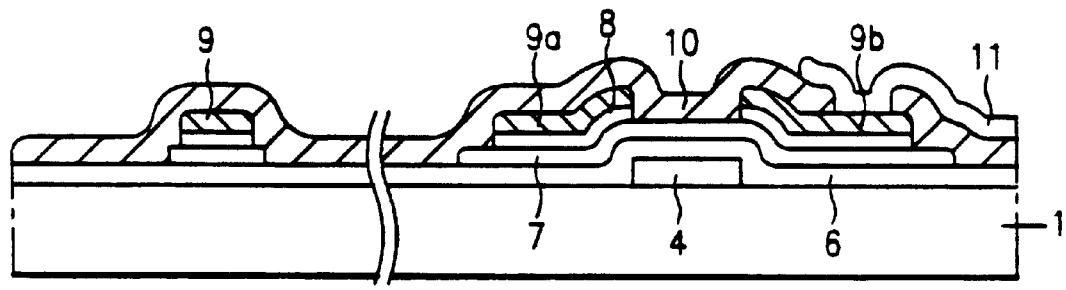

As illustrated in FIG. 6F, a passivation layer 10 is formed on the overall resultant surface of the substrate including the data line 9 and source/drain electrode 9a and 9b. The passivation layer 10 at the drain electrode is selectively removed to form a contact hole. A transparent conductive layer is deposited on the overall resultant surface of the substrate, and then selectively etched to remain on the pixel region. Thus, a transparent region 11 is formed. Here, the transparent electrode 11 of the pixel region is electrically connected to the drain electrode 9b through the contact hole.

Figure 7A:
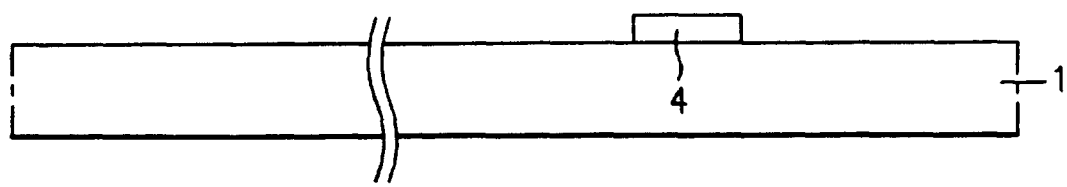
FIGS. 7A to 7F are cross-sectional views taken along line II–II' of FIG. 5 showing an alternative fabrication process of the LCD of the present invention.
Figure 7B:
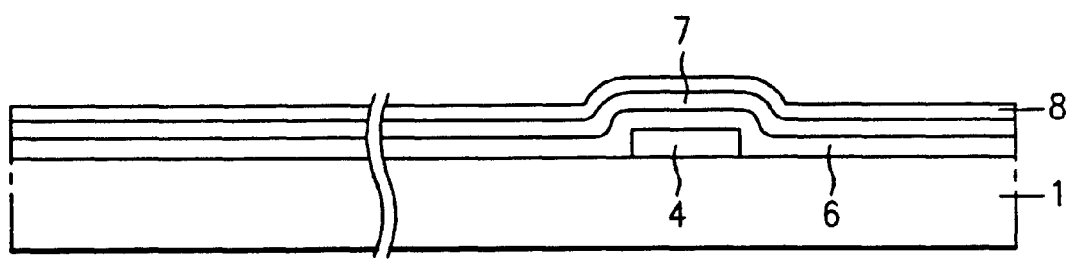
Figure 7C:
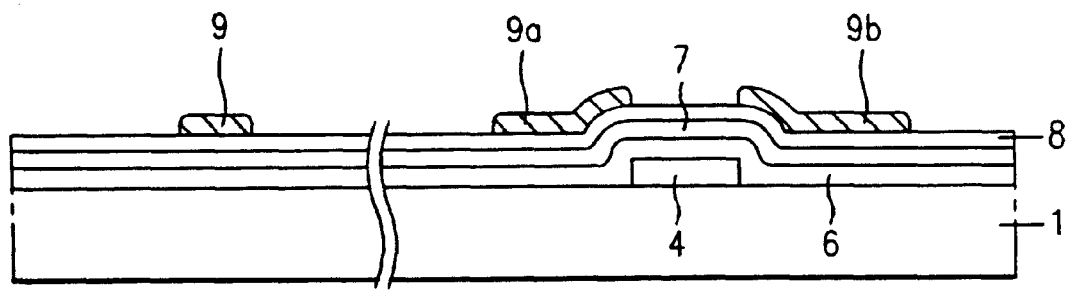

Another method of forming the LCD of the present invention is described with reference to FIGS. 7A to 7E, which are also cross-section views taken along line II–II' in FIG. 5. FIGS. 7A to 7C are similar to FIGS. 6A to 6C.

Figure 7D:
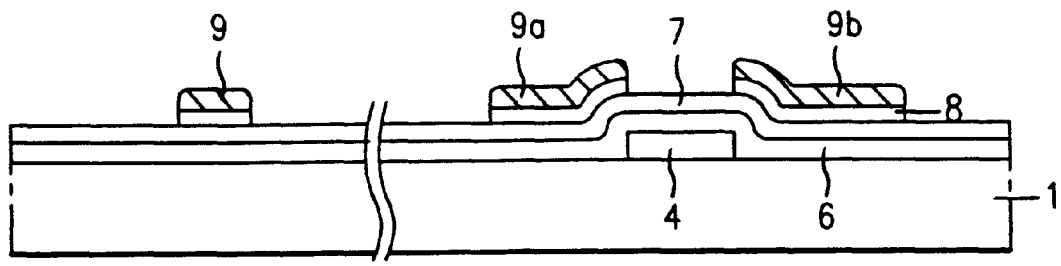
Figure 7E:
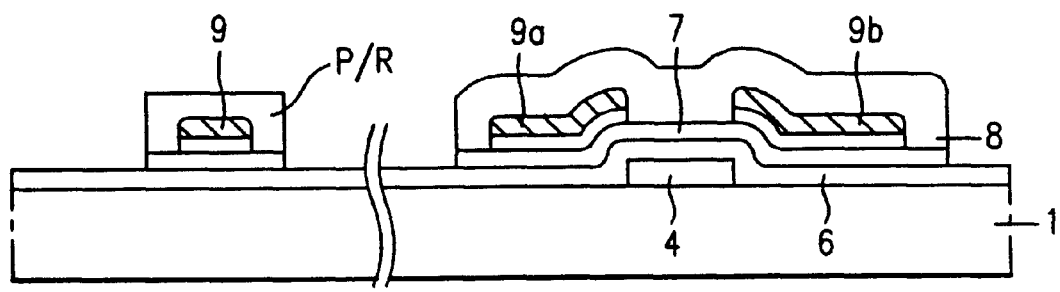

Referring to FIG. 7D, the high concentration n-type amorphous silicon layer 8 is selectively removed to remain only in the data line area and the active area of the TFT. Also, the high concentration n-type amorphous silicon 8 corresponding to the channel region of the TFT is removed using the source and drain electrodes 9a and 9c as masks. Then, the amorphous silicon layer 7 is removed to remain at the data line area and the active area, as shown in FIG. 7E, using a photoresist. The remaining steps are similar to the method described with reference to FIG. 6F.

Figure 7F:
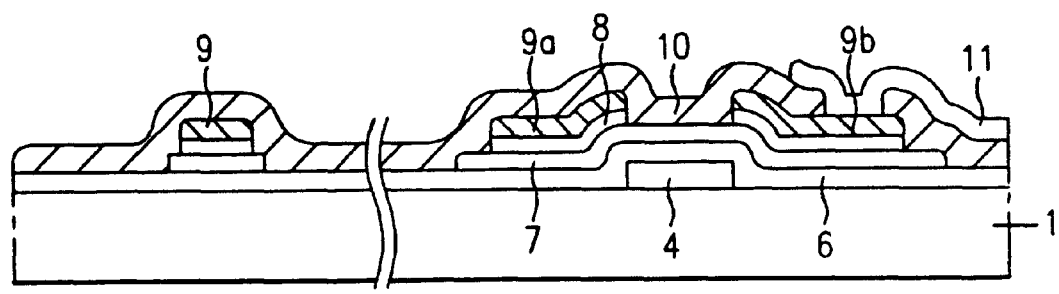
Figure 8:
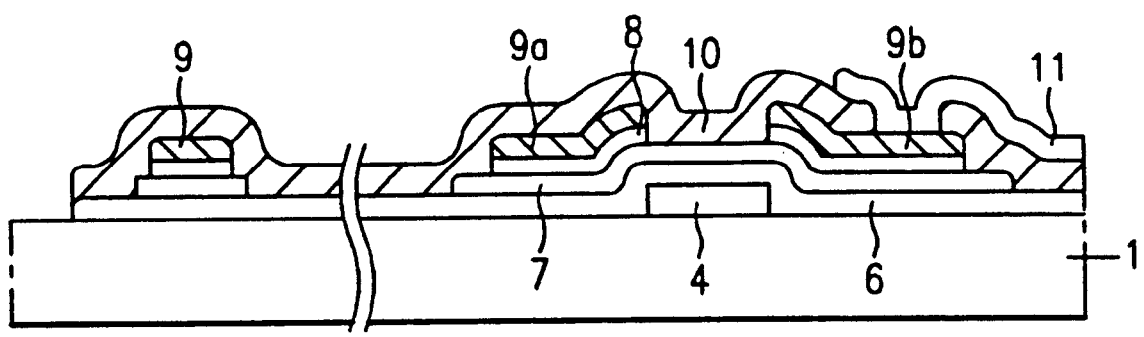
FIG. 8 shows an LCD of one embodiment in accordance with the present invention.
Figure 9:
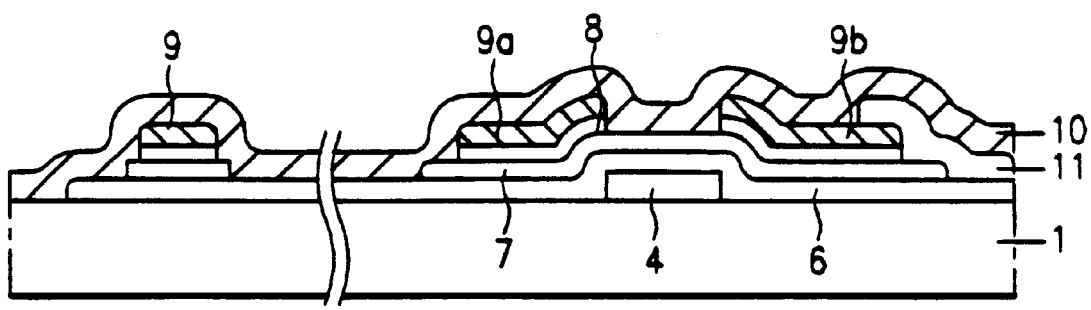
FIG. 9 shows an LCD of an alternative embodiment in accordance with the present invention.

FIGS. 8 and 9 show alternative embodiments in accordance with the present invention. In particular, FIG. 8 shows the embodiment produced from the methods described above. FIG. 9 shows an alternative embodiment where the transparent conductive layer 11 is formed before the passivation layer 10. For the alternative embodiment of FIG. 9, the method shown in FIGS. 6A to 6E and FIGS. 7A to 7E may be used. Instead of FIGS. 6F and 7F, however, the alternative embodiment of FIG. 9 forms the transparent conductive layer 11 connected to the drain electrode 9b. Then, the passivation layer 10 is formed on the overall resultant surface of the substrate.

The above-mentioned LCD and the fabrication methods of the present invention has the following advantages.

In the methods for fabricating the LCD of the present invention, the chrome layer is deposited in a state where the amorphous silicon is deposited on the overall surface, in order to form the data line and source/drain electrode. Accordingly, because the amorphous silicon is deposited on the glass substrate, the glass substrate is bent downward. The chrome layer is deposited over the downward bent structure which has a compensating effect since the chrome layer bends the glass substrate upward. Thus, the data line is prevented from becoming open even though the glass substrate is subject to the tensile stress, thereby enhancing the reliability of the LCD.

It will be apparent to those skilled in the art that various modifications and variations can be made in the liquid crystal display and method for forming the same of the present invention without departing from the spirit or scope of the invention. Thus, it is intended that the present invention cover the modifications and variations of this invention provided they come within the scope of the appended claims and their equivalents.

What is claimed is:

1. A method of forming a liquid crystal display including a thin film transistor, a method comprising the steps of:
    forming a gate electrode on a substrate;
    sequentially forming a gate insulating layer, a first semiconductor layer, and a second semiconductor layer over the substrate and gate electrode;
    forming a conductive layer including a data line and source and drain electrodes on respective portions of the second semiconductor layer; and
    selectively removing the first and second semiconductor layers so that the first and second semiconductor layers remain under the data line and on an active area of the thin film transistor, and a peripheral edge of the remaining first semiconductor layer is not covered by the source or drain electrode, the peripheral edge being substantially parallel to the data line,
    wherein the step of selectively removing the first and second semiconductor layers includes the steps of:
        patterning the second semiconductor layer by using at least a portion of the conductive layer as a mask; and
        patterning the first semiconductor layer using a photoresist mask so that the first semiconductor layer remains at least in an active area including under the source and drain electrodes and a channel region of the thin film transistor.

2. The method according to claim 1, wherein the step of selectively removing the first and second semiconductor layers includes the steps of:
    selectively removing the second semiconductor layer to remain under the data line and the source and drain electrodes; and
    selectively removing the first semiconductor layer to remain under the data line and on the active area.

3. The method according to claim 1, wherein a peripheral portion of a top surface of the remaining second semiconductor layer adjacent to the data line after the step of selectively removing is not covered by the data line.

4. The method according to claim 1, wherein a peripheral portion of a top surface of the remaining first semiconductor layer adjacent to the data line after the step of selectively removing is not covered by the data line.

5. The method according to claim 1, wherein the remaining second semiconductor layer after the step of selectively removing has substantially a same width as the source and drain electrodes.

6. The method according to claim 1, wherein the first semiconductor layer is formed with an intrinsic semiconductor and the second semiconductor layer is formed with a doped semiconductor.

7. The method according to claim 1, wherein the first semiconductor layer includes an amorphous silicon and the second semiconductor layer includes a high concentration n-type amorphous silicon.

8. The method according to claim 1, further comprising the steps of:
    forming a passivation layer on an overall resultant surface of the substrate including a contact hole exposing a portion of the drain electrode; and
    forming a transparent electrode over the passivation layer and connected to the drain electrode through the contact hole.

9. The method according to claim 1, further comprising the steps of:
    forming a transparent electrode connected to the drain electrode after the step of selectively removing; and
    forming a passivation layer over the transparent electrode.

10. The method according to claim 1, wherein the source electrode is connected to the data line, and said peripheral edge of the remaining, first semiconductor layer is adjacent to the drain electrode.

11. A method of forming a liquid crystal display including a thin film transistor, the method comprising the steps of:
    forming a gate electrode on a substrate;
    forming a gate insulating layer on the gate electrode and the substrate;
    forming a first semiconductor layer on the gate insulating layer;
    forming a second semiconductor layer on the first semiconductor layer;
    forming a conductive layer on the second semiconductor layer;
    patterning the conductive layer to form source and drain electrodes of the thin film transistor; and
    selectively removing at least the first semiconductor layer after the step of patterning the conductive layer, wherein the step of selectively removing includes the steps of
        patterning the first and second semiconductor layers using a photoresist mask so that the first and second semiconductor layers remain at least in an active area including under the source and drain electrodes and a channel region of the thin film transistor, and
        using the source and drain electrodes as a mask to remove a portion of the patterned second semiconductor layer not covered by the source and drain electrodes.

12. The method according to claim 11, further comprising the steps of:
   forming a passivation layer on an overall resultant surface of the substrate after the step of selectively removing;
   forming a contact hole through the passivation layer to expose a portion of the drain electrode; and
   forming a transparent electrode over the passivation layer and connected to the drain electrode through the contact hole.

13. The method according to claim 11, further comprising the steps of:
   forming a transparent electrode connected to the drain electrode after the step of selectively removing; and
   forming a passivation layer over the transparent electrode.

14. The method according to claim 11, wherein the remaining second semiconductor layer under the source and drain electrodes after the step of removing has substantially the same width as at least one of the source and drain electrodes.

15. The method according to claim 11, wherein the first semiconductor layer is formed with an intrinsic semiconductor, and the second semiconductor layer is formed with a doped semiconductor.

16. The method according to claim 11, wherein the first semiconductor layer includes an amorphous silicon and the second semiconductor layer includes a high concentration n-type amorphous silicon.

* * * * *